April 13, 1926.  1,580,388
J. F. STRUBLE
WINDMILL
Filed April 30, 1923    2 Sheets-Sheet 1

WITNESSES

INVENTOR
J. F. Struble,
BY
ATTORNEYS

April 13, 1926.  
J. F. STRUBLE  
WINDMILL  
Filed April 30, 1923    2 Sheets-Sheet 2

1,580,388

WITNESSES  
INVENTOR  
J. F. Struble,  
BY  
ATTORNEYS

Patented Apr. 13, 1926.

1,580,388

UNITED STATES PATENT OFFICE.

JAMES FRANKLIN STRUBLE, OF HUTCHINSON, KANSAS.

WINDMILL.

Application filed April 30, 1923. Serial No. 635,614.

*To all whom it may concern:*

Be it known that I, JAMES F. STRUBLE, a citizen of the United States, and resident of Hutchinson, in the county of Reno and State of Kansas, have invented certain new and useful Improvements in Windmills, of which the following is a specification.

This invention relates to windmills and more particularly to the power transmission thereof.

Briefly stated an important object is to provide novel means whereby to stabilize the action and movement of the transmission housing so that the same is efficiently operated and without excessive wear.

A further object is to provide a windmill having a novel form of shaft supporting means which is at all times maintained in a well lubricated condition.

Furthermore the invention forming the subject matter of this application is provided with a novel form of split washer or packing member which may be applied to the main power transmission shaft after the installation of the same.

Other objects and advantages will be apparent during the course of the following description.

In the accompanying drawing forming a part of this application and in which like numerals are employed to designate like parts throughout the same, Figure 1 is a fragmentary side elevation of the improved windmill.

Figures 1, 2:
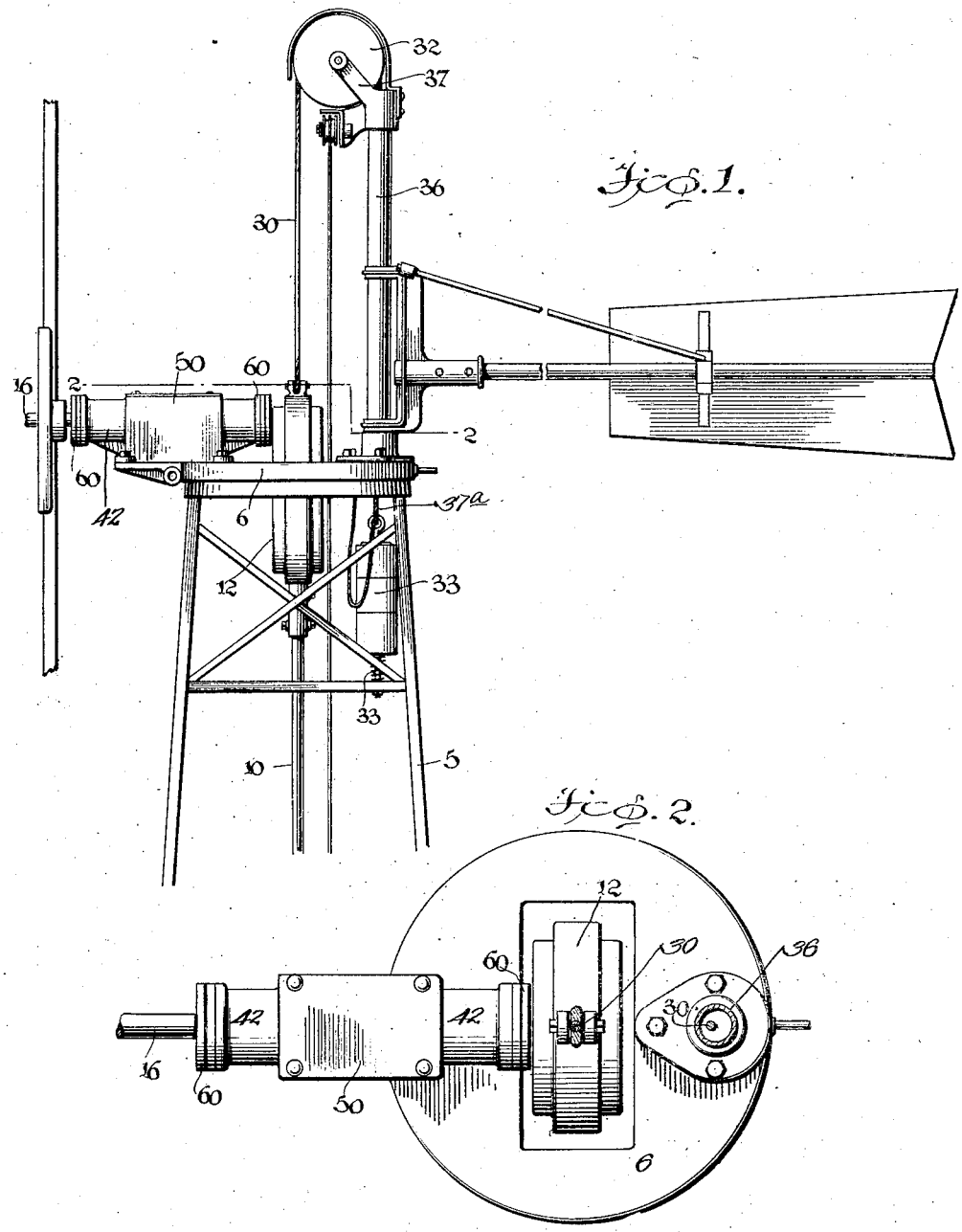
Figure 2 is a horizontal sectional view taken on line 2—2 of Figure 1.
Figure 3:
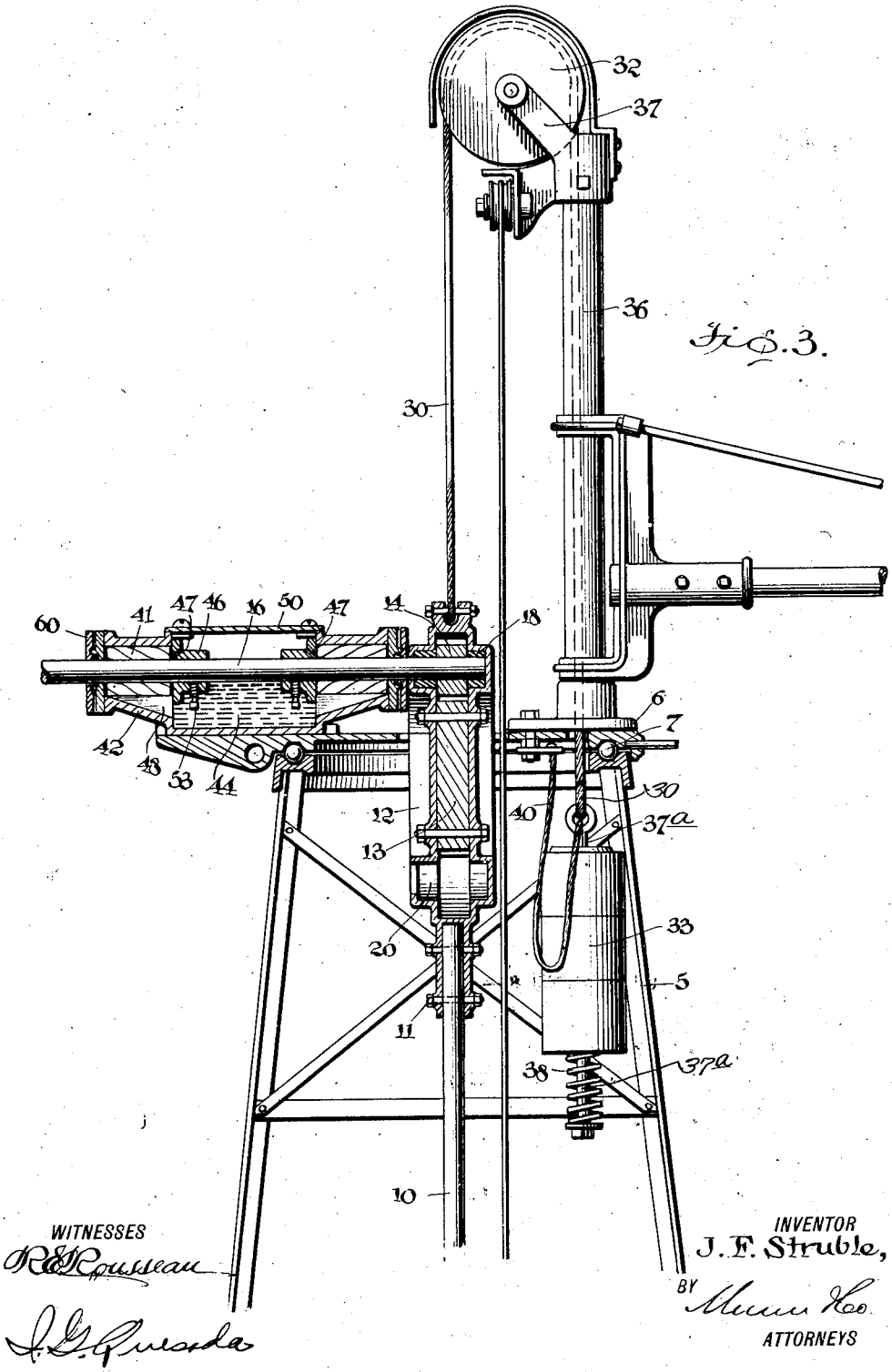
Figure 3 is an enlarged fragmentary side elevation of the windmill, parts being shown in section.

In the drawing the numeral 5 generally designates a tower, the upper end of which rotatably supports a turn table 6. Figure 3 illustrates that an annular series of anti-friction elements 7 are arranged in raceways of the opposed faces of the tower 5 and the turntable 6 so as to permit the turn table to rotate with a minimum of resistance.

The pump rod is designated by the numeral 10 and has its upper end connected as indicated at 11 to the transmission housing 12. The transmission housing may be of the type illustrated in my several copending applications and is provided with a centrally located rack 13 having a continuous series of teeth with which the teeth of a pinion 14 mesh. The pinion 14 is mounted upon one end of the power shaft 16 and when the power shaft is turned the pinion will cause the rack 13 to be moved vertically. The shaft 16 is provided on opposite sides of the pinion 14 with bearings 18 which slide within channels or grooves 20 and thereby hold the teeth of the pinion 14 in engagement with the teeth of the rack 13.

In my several co-pending applications for patents I illustrated a spring to maintain the pinion and the rack properly in mesh at all times and it was found that the spring would soon wear and exert an undesirable tension when the housing was down and exert insufficient tension when the housing was up. Therefore, I have provided a stabilizing cable 30 which is trained about a pulley 32 and is provided at one end with a sectional weight 33.

During the vertical movement of the transmission housing and when the same is at the end of its movement in either direction the weighted cable 30 will exert a uniform tension on the housing and thereby maintain the rack 13 and the pinion properly in mesh. As the cable 30 is connected to the transmission housing 12 at the vertical center of the same it is normally disposed in line with the pump rod 10 so that the rack 13 which at times partakes of a slight lateral movement is urged into engagement with the teeth of the pinion 14. In other words the weight on the cable 30 will exert a constant and uniform tension so that proper connection between the pinion 14 and the rack may be maintained. It will be seen that regardless of whether the continuous rack member is up or down, on the right or left hand side of the pinion 14, the tension exerted by the weighted cable 30 will be the same.

In carrying out the invention a tubular standard 36 is mounted upon the turn table 6 and is provided with brackets 37 which rotatably support the roller or pulley 32. Figure 3 illustrates that the cable 30 passes freely through the tubular standard 36 and has connection with the weight 33 at its lower end.

The weight 33 may consist of a plurality of sections separately mounted upon the rod 37ᵃ so that the weight may be increased or lessened as the occasion requires. Also a spring 38 is mounted upon the lower portion of the rod 37 and provides a cushion connection between the weight and the rod so that in case the weight comes to a sudden stop the strain will be reduced to a minimum. The downward movement of the weight is of course limited by the cable 30 and a safety cable 40 is connected to the looped upper end of the rod 37ª and to the under side of the turn table. It is believed to be obvious that in case the cable 30 breaks the weight of the member 33 will be borne by the cable 40.

The main power transmitting shaft 16 is extended through aligned bearings 41 mounted in a bearing casing 42 secured upon the turn table 6 in any suitable manner. Figure 3 illustrates that the central portion of the bearing housing 42 is provided with an oil reservoir 44 and the bushings 46 secured upon the shaft are formed with oil ducts or passages 47 by means of which oil is supplied to the several bearings. The oil is supplied to the several bearings 40 by means of the oil ducts 47 and the oil upon returning contacts with the bottom walls 48 at the ends of the casing and then flows back to the reservoir 44. The bottom walls 48 are inclined downwardly and inwardly toward the reservoir 44. The oil reservoir 44 which may contain a suitable quantity of oil is provided with a cover plate 50 which may be conveniently detached when desired for the purpose of adjusting the bushings or thrust members 46 longitudinally on the shaft 16 to compensate for wear. Set screws 53 are employed to hold the thrust members 46 in a set position on the shaft and as wear occurs the thrust members may be adjusted longitudinally. Suitable packing members 60 are located at the outer ends of the bearings 40 and consist of a pair of coacting flat sections having their ends in overlapping relation.

With reference to the foregoing description taken in connection with the accompanying drawing it will be seen that a windmill constructed in accordance with this invention is of very simple construction and operation since the transmission housing 12 is at all times maintained in its proper position.

Having thus described the invention, what is claimed is:—

1. The combination of a tower, of a turn table supported thereon, a tubular housing mounted upon the turn table and having its upper end provided with a pulley, a weighted cable extending through said housing and trained about said pulley, a power transmitting member connected to said cable and having a continuous rack, and a power transmitting pinion arranged in said transmission and having engagement with said rack.

2. A windmill comprising a tower, a turn table mounted thereon, a transmission movable through the turn table and having a continuous rack and oppositely located channels at opposite sides of the rack, a main pinion in engagement with the rack, a power transmitting shaft connected to the pinion and having bearings located in said channels, a weighted cable connected to said transmission for constantly urging the same upwardly, said cable being connected to the vertical center of said transmission, a tubular standard mounted upon the turntable and having a pulley, the cable being trained about the pulley and extending through said standard, and a pump rod connected to the lower portion of the transmission at the vertical center of the same.

3. A windmill comprising a tower, a turn table mounted thereon, a transmission movable through the turn table and having a rack provided with an endless series of teeth, a pinion engaging said teeth and adapted to move the transmission vertically and laterally, a cable connected to the vertical center of said transmission, a weight connected to the cable and adapted for urging the transmission upwardly, a tubular standard mounted upon the turn table and having a pulley about which said cable is trained, means providing a yieldable connection between the weight and the cable, and a pump rod connected to the transmission at the vertical center of the same.

4. A windmill comprising a tower, a turn table mounted thereon, a transmission movable through the turn table and having a continuous rack member, a pinion engaging said rack member and adapted to move instead the transmission vertically and laterally, a cable connected to the vertical center of said transmission, a weight connected to the cable and adapted to urge the transmission upwardly, a tubular standard mounted upon the turn table and having a pulley about which the cable is trained, means providing a yieldable connection between the weight and the cable, a pump rod connected to the transmission at the vertical center of the same, and a main shaft connected to said pinion and having bearings engaged with the interior of the transmission.

JAMES FRANKLIN STRUBLE.